(12) United States Patent
Burger et al.

(10) Patent No.: US 6,238,326 B1
(45) Date of Patent: May 29, 2001

(54) METHOD FOR THE REGULATION OF THE TEMPERATURE OF THE HEATED AIR IN AN APPARATUS FOR THE HOT-AIR PASTING OF PLASTIC FILMS

(75) Inventors: Jan Burger, Osnabrück; Rainer Henze, Lengerich, both of (DE); Franz X. Starlinger-Huemer, Wien (AT)

(73) Assignees: Windmoller & Holscher, Lengerich/Westf. (DE); Starlinger & Co. Ges.m.b.H., Wien (AT)

( * ) Notice: Subject to any disclaimer, the term of this patent is extended or adjusted under 35 U.S.C. 154(b) by 0 days.

(21) Appl. No.: 09/300,565

(22) Filed: Apr. 27, 1999

(30) Foreign Application Priority Data

Apr. 27, 1998 (DE) .............................................. 198 18 720

(51) Int. Cl.$^7$ ...................................................... B31B 49/00
(52) U.S. Cl. ...................... 493/3; 493/5; 493/8; 493/219; 493/331
(58) Field of Search .................................. 493/3, 5, 8, 37, 493/219, 332, 334, 331, 265, 264; 53/76, 75; 219/494, 388; 156/64, 359, 378; 374/153

(56) References Cited

U.S. PATENT DOCUMENTS

| | | | |
|---|---|---|---|
| 3,951,050 | * 4/1976 | Poole | 93/35 R |
| 4,850,944 | * 7/1989 | Osborn | 493/5 |
| 5,466,326 | * 11/1995 | Cherney | 156/359 |
| 5,735,604 | * 4/1998 | Ewals et al. | 374/134 |
| 5,804,029 | * 9/1998 | Achelpohl et al. | 156/497 |
| 5,821,505 | * 10/1998 | Tustaniwskyj et al. | 219/494 |

* cited by examiner

Primary Examiner—Peter Vo
Assistant Examiner—Sam Tawfik
(74) Attorney, Agent, or Firm—Dilworth & Barrese

(57) ABSTRACT

To regulate the temperature of the heated air in an apparatus for the pasting of plastic films having a rack having a table over which the workpieces are conveyed continuously by a conveyor apparatus, having a conveyor roller pair disposed in a gap of the table top and supported in the rack, consisting of a lower counter-pressure roller and an upper suction cylinder, having a conveyor cylinder acting together with the suction cylinder which successively transfers sections to the suction cylinder, and having a broad-slit nozzle directed to the roller gap which blows in a controlled manner heated air to the roller gap, the temperature directly after the pasting of the pasted region of the workpiece at which a good pasting occurs is determined as the nominal value and the temperature of the heated air is regulated to this nominal value.

19 Claims, 2 Drawing Sheets

METHOD FOR THE REGULATION OF THE TEMPERATURE OF THE HEATED AIR IN AN APPARATUS FOR THE HOT-AIR PASTING OF PLASTIC FILMS

BACKGROUND OF THE INVENTION

The invention relates to an apparatus for the pasting of plastic films, preferably for the affixing of section of plastic film to flat-lying workpieces made of plastic film, e.g. of valve sections to the applied bottom squares or of bottom covers to the added bottoms of cross bottom valve sacks, consisting of a rack with a plate or a table over which the tube parts or workpieces are continuously transported by a conveyor unit, of a conveyor roller pair disposed in a gap in the table top and supported in the rack whose roller gap is essentially flush with the table surface and whose lower roller is a counter-pressure roller and whose upper roller is a suction cylinder, of a conveyor cylinder interacting with the suction cylinder which successively transfers the sections to the suction cylinder and of a broad-slit nozzle directed to the roller gap which blows heated air into the roller gap in a controlled manner.

In an apparatus of this type known from DE 195 02 255 A1, the workpieces, that is, for example in the manufacture of cross bottom sacks, the tube pieces with applied or added bottoms, are continually transported over a plate or a table on which they are supported, with them sliding over the table. If sections or covers are applied simultaneously to both applied or added bottoms, the successive transportation of the workpieces is performed in a transverse orientation. The table is provided with a conveyor roller pair in a gap whose roller gap is essentially flush with the table surface so that the workpieces can run into this roller gap. Of the conveyor roller pair, the lower roller is designed as the counter-pressure roller while the upper roller is a suction cylinder. This suction cylinder, which has air-intake boreholes provided in its jacket, for example at equal angle distances, works together with a conveyor cylinder which successively transfers the sections to the suction cylinder. This suction cylinder thus irons—so to speak—the sections in the roller gap on the workpieces running therethrough. So that the section adheres to the workpiece, a broad-slit nozzle is directed onto the roller gap which blows heated air into the roller gap in a controlled manner. In this process, the air possesses such a high temperature that the surfaces of the section and of the workpiece are plasticised up to stickiness so that the sections are pressed onto the workpiece in the roller gap of the conveyor roller pair and in this way a good adhesion of the section to the workpiece is performed. The feed of the sections is coordinated with the passage of the workpieces in such a way that a positionally correct pasting of the sections to the workpieces is performed. The feed of the hot air in this process is controlled in such a way that essentially only the regions to be pasted together are plasticised or fused in the required manner. In this process, the rate of passage of the individual workpiece and the section are selected so that a good adhesion of both parts is performed. As the hot air which effects the adhesion is blown into the roller gap, it cannot be excluded that the suction cylinder heats up as time passes. This warming is, however, basically of a non-damaging nature, as the suction cylinder has no mechanical parts, for example gripping devices, which could become incapable of function over the operating time due to clogging with plasticised plastic. If necessary, the suction roller can additionally be provided with a cooling. In any case, the suction roller prevents the conveyor cylinder from heating up in an impermissible manner due to the hot air so that its functional capability could be impaired.

The adhesion of the sections to be pasted to the upper roller of the conveyor roller pair could also be effected by the upper roller comprising a statically charged cylinder instead of a suction cylinder.

The conveyor cylinder transferring the sections to the suction cylinder is appropriately a cutter cylinder whose cutters separate the sections from a plastic sheet running continuously or intermittently. To retain the section on the conveyor cylinder, it can be wrapped on a part of its circumference by a strand side of an endless belt or an endless belt herd which press the section to be transferred to the circumference of the conveyor cylinder.

The conveyor cylinder can also be provided with grips to retain the sections on it.

Appropriately a cooling sheet is disposed above the table top, with the workpieces being fed to the roller gap through the gap between the cooling sheet and the table top. This cooling sheet, which can be provided with channels through which a cooling medium flow, prevents the table and other apparatus parts from heating up due to the hot air blown into the roller gap in such a way that the workpieces in plastic become sticky and may get caught on the table top or other apparatus parts.

In another aspect of the invention, there is disposed in the feed line to the broad-slit nozzle a valve which is provided with a control device for the controlled blowing out of the hot air into the roller gap. The valve can, for example, consist of a rotary slide valve which is adjusted by a pressure means piston cylinder unit for its control.

To focus the broad-slit nozzle in an optimum manner on the roller gap, the broad-slit nozzle can be travelled by a control device in the direction of the roller gap and back.

In this process, the broad-slit nozzle can be travelled back so far that it is completely removed from the region of the roller gap.

One special problem in the apparatus known from DE 195 02 255 A1 results from the fact that the required quantity of heat has to be supplied to the regions to be pasted by the heated air blown out of the broad-slit nozzle. This quantity of heat, however, fluctuates in accordance with the ambient temperature and the temperature of the apparatus. For this reason, in the known device, the heating unit which warms the air is connected to an adjustment apparatus which the machine operator adjusts on the basis of his observation of the pasted regions in such a way that hotter or colder air is blown out from the broad-slit nozzle. The adjustment of the temperature of the heated air by hand on the basis of an observation of the pasted regions is, however, necessarily subject to error as both the observations can not be performed precisely enough and because the adjustment by hand cannot be effected precisely enough.

SUMMARY OF THE INVENTION

It is therefore the object of the invention to provide a method for the regulation of the temperature of the warmed air of the type first given which allows a precise regulation of the temperature to optimally performed pastings.

This object is solved in accordance with the invention in that the temperature directly subsequent to the pasting of the pasted region of the workpiece at which a good pasting is effected is determined as the nominal value and that the temperature of the warmed air is regulated to this nominal value.

On the basis of an inventive idea, it was found that the quality of the pasting performed can be determined directly after the performance of the pasting by the temperature of the pasted region. For in dependence on the plastic material to be welded in each case, the pasted region possesses— directly after the performance of a pasting, which has been performed in an optimum manner—a predetermined temperature which can be determined by measurement. This predetermined temperature, which indicates optimum pasting, is determined empirically or in another way and forms the nominal value of the regulation process. To achieve optimum pastings in accordance with this predetermined nominal value, the temperature of the warmed air is regulated to this nominal value.

A continuous regulation is necessary because the actual temperature of the pasted region fluctuates according to the temperature of the ambient air and the temperature of the apparatus itself.

In accordance with the method in accordance with the invention, the temperature of the pasted region of the workpiece is measured as the actual value directly after the pasting and the temperature of the warmed air is increased or decreased for so long until the actual value of the measurement corresponds to the nominal value.

The regulation of the temperature of the heated air to the nominal value is made particularly difficult when the apparatus is cold due to a longer period of standing still. In accordance with a preferred embodiment of the invention, it is therefore provided that the temperature of the apparatus is measured and a pre-setting of the temperature of the warmed air is made in accordance with this temperature. Due to the subsequent regulation, generally only fairly small deviations of the actual value from the nominal value therefore need to be regulated.

BRIEF DESCRIPTION OF THE DRAWINGS

One embodiment of the invention is described in more detail below by means of the drawing in which.

DESCRIPTION OF THE PREFERRED EMBODIMENTS

Figure 1:
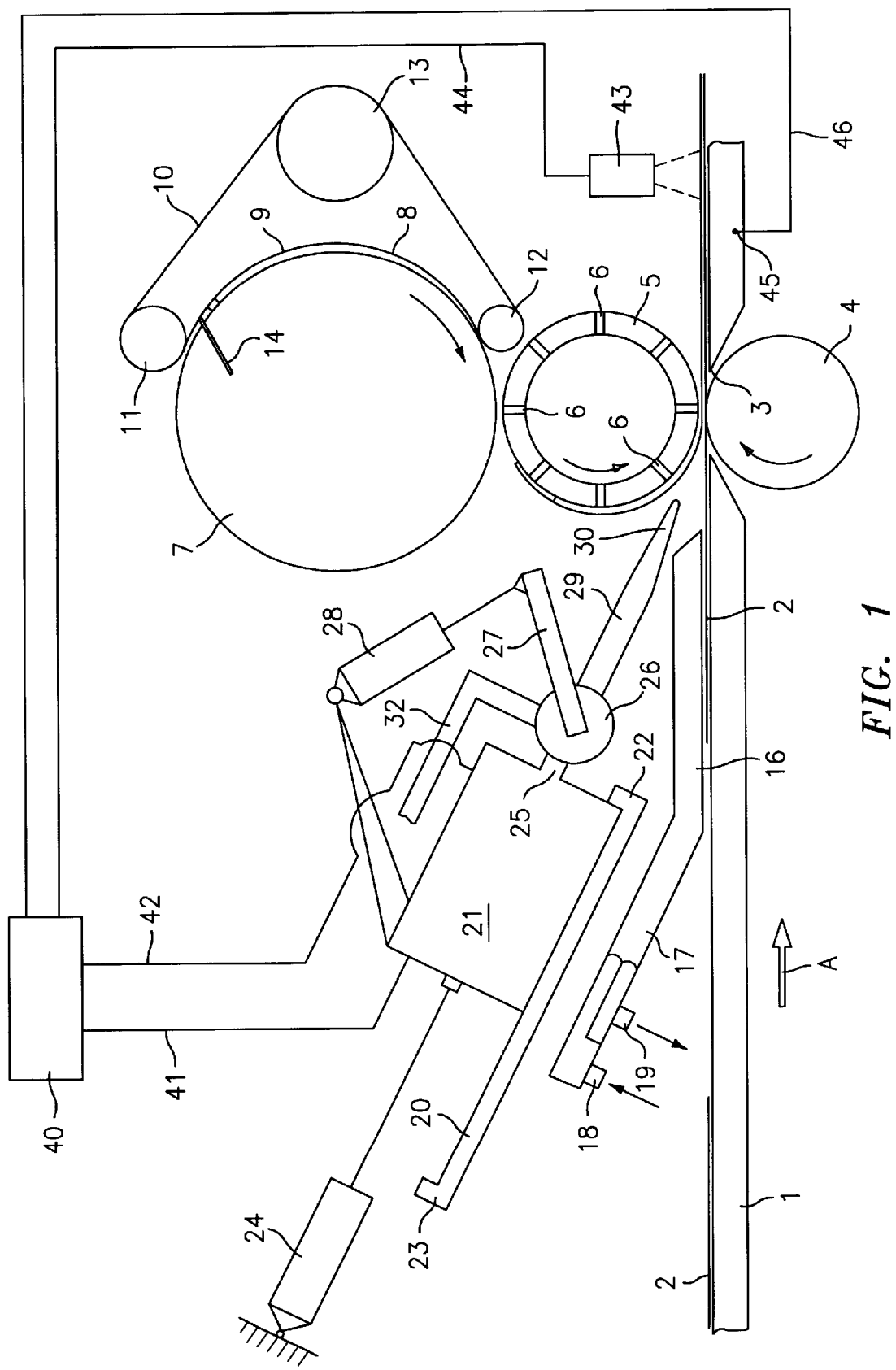
FIG. 1 shows a side view of the apparatus to apply and to paste sections to workpieces in a schematic view.

In a rack (not shown), a table top 1 is held on which in the direction of the arrow A, flat-laying tube pieces of plastic with applied or added bottoms are continually conveyed by conveyor apparatus (not shown). In the hose pieces 2 conveyed with a transverse orientation at mutual distances to one another, the added bottoms or the applied bottoms are folded in the plane of the flat-lying hose pieces in the manner visible from FIGS. 2 and 3. In a transverse gap 3 of the table 1, a counter-pressure roller 4 and a suction roller 5 are supported in the machine rack which together form a conveyor roller pair and whose roller gap lies in the region of the plane of the top side of the table 1. The suction cylinder 5 is provided in its jacket with rows of air-intake boreholes 6 at roughly equal angle distances. The suction air is fed into the inside of the suction cylinder 5 in the usual manner by a rotary transmission (not shown).

Above the suction cylinder 5, a cutter and conveyor cylinder 7 is supported in the machine rack on which the sections 8 separated from an endless plastic sheet (not shown) are pressed by a strand side 9 of an endless belt herd 10 which run around deflection pulleys 11, 12, 13 supported above the machine rack by which the roller 13 can also be driven. The cutter and conveyor cylinder 7 is provided with a cutter 14 running along a surface line in the usual way.

Prior to the roller gap of the cylinder pair 4, 5, a cooling sheet 16 ends which is provided with a run-in side 17 angled upwards. The cooling sheet 16, 17 is provided with cooling tubes in a meander and/or snake-like form through which a cooling medium flows. This cooling medium, for example water, is fed in through tube lines (not shown) in the connections 18 and removed again through the drainage connections 19. Above the cooling sheet 16, 17, a slanted guide 20 is held in the machine rack on which a heating unit 21 can be travelled to and from between stops 22, 23 of the guide 20 by a pressure means piston cylinder unit 24. The cooling unit is provided on its front end with a tube 25 to blow out hot air. In this tube 25, a rotary slide valve 26 is disposed whose slide can be set to an open and a closed position and to intermediate positions by means of an actuating lever 27. To actuate the lever 27, a pressure means piston cylinder unit 28 is provided which, on the one side, is hinged to the hot air unit 21 and, on the other, to the actuating lever 27. One outlet of the rotary slide valve 26 ends in a tube 29 which bears a broad-slit nozzle 30 which is aligned in the gap between the rollers 4, 5. The other outlet of the rotary slide valve 26 ends in a tube 32 that ends in free air or lets out the hot air.

The suction cylinder 5 takes over the sections 8 in the manner shown from the cutter and conveyor cylinder 7 and places these positionally correct on the sack workpieces passing through. In this process, hot air is blown at controlled times through the broad-slit nozzle 30 into the roller gap in which the section 8 and the workpiece 2 are located and this hot air plasticises the plastic material or fuses it in such a manner that the sections 8 stick to the workpieces 2.

The hot-air feed is controlled in cycles by a control apparatus via the pressure means piston cylinder unit 28. Further, the broad-slit nozzle 30 can be adjusted in the desired manner in its distance to the roller gap by means of the pressure means piston cylinder unit 24.

Figure 2:
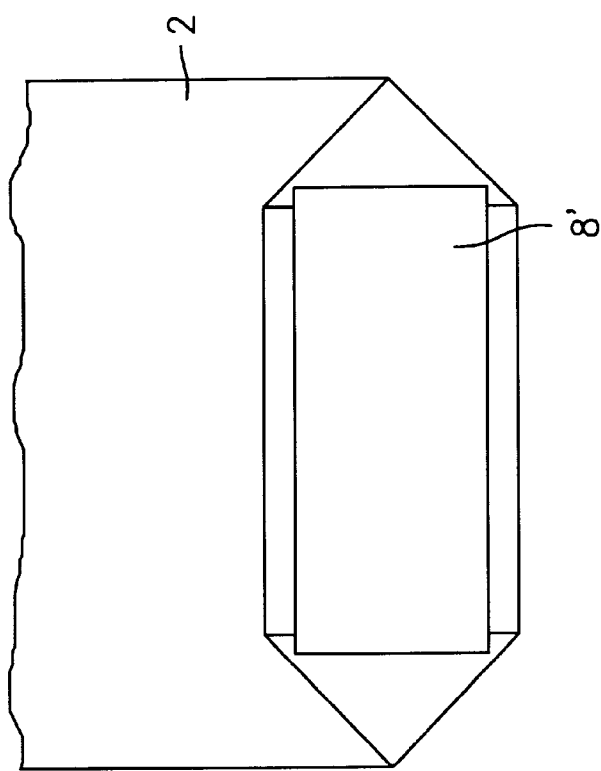
FIG. 2 shows a top view of an added cross bottom with pasted bottom cover.

In FIG. 2, a workpiece can be seen consisting of an added cross bottom on which a bottom section 8' has been pasted.

Figure 3:
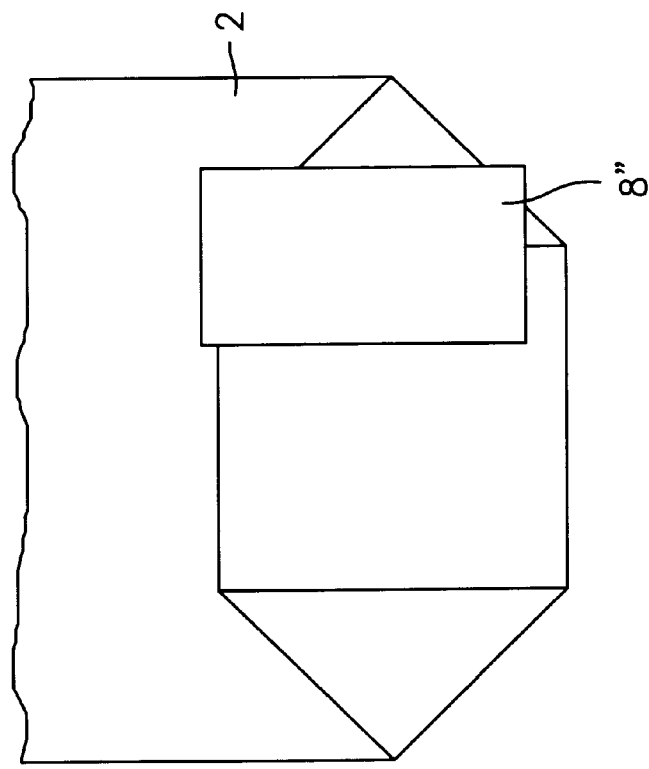
FIG. 3 shows an applied bottom with a valve section pasted to a corner fold.

In FIG. 3, a sack workpiece 2 with still open bottoms can be seen where the valve section 8" is pasted on the protruding corner fold of the one bottom which, when the side folds are folded in a known manner, produces a valve tube.

The apparatus visible from FIG. 1 is provided in double on both sides of the table 1 if both bottoms formed on the tube piece 2 are to be provided simultaneously with bottom covers 8'.

To this extent, the apparatus described corresponds to the apparatus in accordance with DE 195 02 255 A1.

In accordance with the invention, the temperature of the heating unit 21 or of the air heated by this serving the pasting is measured by a temperature sensor (not shown). The temperature signals of the temperature sensor are led by a signal line 41 to a control and regulating unit 40 consisting of a computer. This control and regulating unit 40 controls the temperature of the heated air blown out by a control line 42 which accordingly increases or lowers the temperature of the electrical heating elements of the heating unit 21.

Directly behind the roller pair comprising the counter-pressure roller 4 and the suction roller 5, the temperature of the pasted region of the tube pieces 2 is measured by a temperature sensor, in the embodiment shown by a infrared pyrometer 43, which is disposed in the machine rack at the pre-determined distance above the workpieces running out. The measurement signals of the temperature sensor 43 are led by a signal line 44 to the control and regulation unit 40 which correspondingly increases or decreases the temperature of the hot air to regulate the temperature of the hot air blown out of the broad-slit nozzle 30 to the nominal temperature of the pasted region.

The temperature of the table 1 is measured after the gap of the rollers 4, 5 by a temperature sensor 45 whose signals are fed by a signal line 46 to the control and regulation unit 40. The temperature sensor 45 essentially detects the temperature of the apparatus so that via the control and regulation unit a pre-adjustment of the temperature of the hot air blown out of the broad-slit nozzle 30 can be made.

Irrespective of the regulation described, the temperature of the hot air brown out of the broad-slit nozzle 30 can also be adjusted by hand at the control and regulation unit, which may be appropriate for the pre-setting of the temperature.

What is claimed is:

1. A method for regulation of temperature of heated air in an apparatus for pasting of plastic film, comprising the steps of arranging a rack with a table (1) over which workpieces (2) are conveyed continuously by arranging a conveyor device therewith;

disposing a conveyor roller pair (4,5) in a gap (3) of the table top (1) and supported in the rack and forming a roller gap essentially flush with the table surface and having a lower roller (4) which is a counter-pressure roller and an upper roller which is a suction cylinder 5;

arranging a conveyor cylinder (7) to interact with the suction cylinder (5) which successively transfers sections (8) of the plastic film to the suction cylinder (5);

directing a broad-slit nozzle (30) to the roller gap to blow heated air into the roller gap in a controlled manner, determining temperature directly after pasting of a pasted region of the workpiece at which a good pasting is performed as a nominal value; and regulating the temperature of heated air to this nominal value.

2. A method in accordance with claim 1, comprising the additional steps of measuring the temperature of the pasted region of the workpiece as an actual value directly after the pasting and increasing or decreasing the temperature of the heated air until the actual value of the measurement corresponds to the nominal value.

3. A method in accordance with claim 2 comprising the step of measuring temperature of the pasting apparatus and pre-adjusting the temperature of the heated air corresponding to this measured temperature.

4. A method in accordance with claim 1, comprising the additional step of measuring temperature of the pasting apparatus and pre-adjusting the temperature of the heated air corresponding to this measured temperature.

5. A method in accordance with claim 1, comprising the step of applying sections (8) of plastic film to flat-lying work pieces (2) of plastic film.

6. A method in accordance with claim 4, comprising the step of applying valve sections to bottom squares or bottom covers to added bottoms of cross bottom valve sacks.

7. A method in accordance with claim 6, comprising the step of measuring temperature of the pasting apparatus and pre-adjusting the temperature of the heated air corresponding to this measured temperature.

8. A method in accordance with claim 5, comprising the step of measuring temperature of the pasting apparatus and pre-adjusting the temperature of the heated air corresponding to this measured temperature.

9. A method according to claim 1, comprising the steps of measuring the pasted region of the workpiece immediately downstream of the gap (3) of the rollers with a pyrometer arranged in the rack at a predetermined distance above the workpiece, and feeding signals from the pyrometer to a control and regulation unit which correspondingly increases or decreases temperature of the heated air blown out of the nozzle (30) to the nominal temperature of the pasted region.

10. A method according to claim 9, comprising the step of measuring temperature of the table (1) immediately after the gap (3) of the rollers (4,5) as said nominal value.

11. A method according to claim 10, comprising the additional step of arranging a sensor (45) on the table and directing the signal to the control and regulation unit.

12. A method according to claim 11, comprising the additional steps of measuring temperature of a heating unit or air heated by the same and which is fed to the nozzle (30), with a temperature sensor, and directing a measured temperature signal from the sensor along a signal line to the control and regulating unit.

13. A method according to claim 9, comprising the additional steps of measuring temperature of a heating unit or air heated by the same and which is fed to the nozzle (30), with a temperature sensor, and directing a measured temperature signal from the sensor along a signal line to the control and regulation unit.

14. A method according to claim 10, comprising the additional steps of measuring temperature of a heating unit or air heated by the same and which is fed to the nozzle (30), with a temperature sensor, and directing a measured temperature signal from the sensor along a signal line to the control and regulation unit.

15. A method according to claim 1, comprising the step of measuring temperature of the table (1) immediately after the gap (3) of the rollers (4,5) as said nominal value.

16. A method according to claim 15, comprising the additional step of arranging a sensor (45) on the table and directing the signal to a control and regulation unit which correspondingly pre-adjusts temperature of the heated air blown out of the nozzle.

17. A method according to claim 16, comprising the additional steps of measuring temperature of a heating unit or air heated by the same and which is fed to the nozzle (30), with a temperature sensor, and directing a measured temperature signal from the sensor along a signal line to the control and regulating unit.

18. A method according to claim 15, comprising the additional steps of measuring temperature of a heating unit or air heated by the same and which is fed to the nozzle (30), with a temperature sensor, and directing a measured temperature signal from the sensor along a signal line to a control and regulating unit which correspondingly increases or lowers the temperature of heating elements with the heating unit.

19. A method according to claim 1, comprising the additional steps of measuring temperature of a heating unit or air heated by the same and which is fed to the nozzle (30), with a temperature sensor, and directing a measured temperature signal from the sensor along a signal line to a control and regulating unit which correspondingly increases or lowers the temperature of heating elements with the heating unit.

\* \* \* \* \*